United States Patent [19]

Schuppiser

[11] Patent Number: 4,999,047
[45] Date of Patent: Mar. 12, 1991

[54] XANTHAN GUM/CATIONIC COMPOUND AQUEOUS CONCENTRATES

[75] Inventor: Jean-Luc Schuppiser, Claye Souilly, France

[73] Assignee: Rhone-Poulenc Chimie, Courbevoie, France

[21] Appl. No.: 381,486

[22] Filed: Jul. 18, 1989

Related U.S. Application Data

[63] Continuation of Ser. No. 24,073, Mar. 10, 1987, abandoned.

[30] Foreign Application Priority Data

Mar. 10, 1986 [FR] France ................................ 86 03337

[51] Int. Cl.$^5$ ........................ C12P 19/06; C07G 17/00
[52] U.S. Cl. ........................................ 71/94; 435/104; 536/114
[58] Field of Search ............. 536/114; 71/94, DIG. 1; 435/104

[56] References Cited

U.S. PATENT DOCUMENTS 3,920,443 11/1975 Drewe et al. ............................ 71/94
4,296,203 10/1981 Wernau ................................ 536/114

FOREIGN PATENT DOCUMENTS 0066961 12/1982 European Pat. Off. ............ 435/104
2235959 2/1973 Fed. Rep. of Germany ... 71/DIG. 1

OTHER PUBLICATIONS

Sandford et al., "Separation of Xanthan Gums of Differing . . . ", Abstracts, Papers Amer. Chem. Soc. Meeting, 174, CARB-29 (1977).

Primary Examiner—Richard L. Raymond
Assistant Examiner—Brian M. Burn
Attorney, Agent, or Firm—Burns, Doane, Swecker & Mathis

[57] ABSTRACT

Pseudoplastic aqueous concentrates, well adapted for dilution with water to constitute precipitate-free sprayable compositions useful, e.g., for plant protection, are formulated in water from a thickening amount of a xanthan gum having a content in pyruvic acid moieties of less than about 2%, and at least one water soluble organic cationic compound, e.g., a cationic pesticide.

4 Claims, No Drawings

XANTHAN GUM/CATIONIC COMPOUND AQUEOUS CONCENTRATES

This application is a continuation of application Ser. No. 024,073, filed Mar. 10, 1987, abandoned.

BACKGROUND OF THE INVENTION

1. Field of the Invention:

The present invention relates to novel compositions comprising aqueous solutions of a cationic organic compound and a xanthan gum. This invention also relates to aqueous plant protection compositions comprised of a cationic pestically active agent.

2. Description of the Prior Art:

Xanthan gum, because of its thickening properties, its great capacity for suspension and its particular rheology, is widely used in a variety of different industries, in particular in the food, construction, textile, paint, paper, cosmetic, agriculture, petroleum, etc., industries.

Xanthan gum is an anionic heteropolysaccharide consisting of D-glucose, D-mannose and D-glucuronic acid units, together with acetyl and pyruvate radicals depending from the mannose units. The proportion of pyruvic acid moieties varies as a function of the specific starting material, the composition of the culture medium, the conditions of fermentation and extraction, and ranges from 2.5 to 4.9% in the industrial grades.

By virtue of its anionic character, xanthan gum is generally considered to be incompatible with cations, an obstacle to the effective use thereof. Thus, it is known in the field of agriculture to use xanthan gums as thickening agents in aqueous compositions containing a water soluble active pesticide, or as a stabilizing and suspending agent in flowable aqueous dispersions containing a finely divided material ("flowables"). These solutions or dispersions are available commercially in the form of a concentrate with 20 to 50% active agent and approximately 0.2 to 2% of xanthan gum. However, this use has to date been limited to nonionic or anionic active agents.

The end user, who in certain cases, in order to avoid several manipulations, seeks to mix the dilute dispersion of a pesticide insoluble in water with a water soluble pesticide such as a quaternary ammonium salt, is confronted with a particularly serious problem. It has been found that, with low concentrations of xanthan in dilute formulations, a complex is formed with quaternary ammonium compounds, manifesting itself in the form of dense insoluble fibers in water. In addition to a reduction in pesticidal activity caused by the formation of such complexes, considerable difficulties are encountered during field spraying, due to a clogging of the spray nozzles by the insoluble fibers.

SUMMARY OF THE INVENTION

Accordingly, a major object of the present invention is the provision of a novel class of pseudoplastic aqueous compositions, thickened by xanthan gums and including a cationic additive, which novel aqueous compositions are adapted for dilution without concomitant precipitation.

Briefly, the present invention features concentrated, flowable pesticidal compositions of matter containing both a finely divided active agent that is insoluble in water, as well as a water soluble cationic active agent, formulated such that the water soluble fraction does not precipitate by dilution to form precipitates interfering with field applications.

This invention also features flowable concentrated dispersions containing a finely divided active pesticidal agent that is insoluble in water, said dispersions being adapted for dilution and addition thereto of a water soluble active cationic agent, both in the absence of precipitation.

DETAILED DESCRIPTION OF THE PREFERRED EMBODIMENTS OF THE INVENTION

More particularly according to the present invention, it has now unexpectedly been determined that the incompatibility of a xanthan gum in a solution greatly diluted with water soluble cationic compounds depends upon the proportion of pyruvic acid moieties bonded to the xanthan molecule.

The aqueous compositions of the invention are more particularly characterized in that they contain at least one water soluble, cationic organic compound and a xanthan gum having less than about 2% of pyruvic acid moieties bonded thereto.

The preparation of xanthan gum by fermentation of a carbohydrate under the action of an appropriate microorganism is described in numerous patents and publications, for example, in U.S. Pat. Nos. 3,020,206, 3,020,207 and 3,391,060. Exemplary of such microorganisms, bacteria of the genus Xanthomonas, and more particularly *Xanthomonas campestris*, are typically used, although numerous other microorganisms have been reported as producing heteropolysaccharides that are similar in structure. As indicated above, the common Xanthomonas feedstocks produce a xanthan gum having a proportion of pyruvic acid moieties of greater than 2% under the typical industrial conditions.

Depyruvization of xanthan gum may be carried out in conventional manner by heating the fermentation wort, or solution thereof reconstituted from powder, at an acid pH and at a temperature equal to or higher than about 90° C. [*Carbohydr. Res.*, 76, 277–80 (1979)].

The xanthan gum used in the compositions of the invention has a pyruvic acid content of from 0 to about 2%.

The water soluble cationic compounds which form insoluble complexes with xanthan gum are represented principally by quaternary ammonium species, such as the chlorides, bromides and sulfates. Representative examples of quaternary ammonium compounds which react with heteropolysaccharides are described in U.S. Pat. No. 3,163,602, incorporated herein by reference. Quaternary ammonium compounds including alkyl moieties which impart a hydrophobic character, as well as the difunctional quaternary ammonium compounds, form such insoluble complexes quite readily.

Cationic compounds and particularly quaternary ammonium such compounds include surface active agents useful for a variety of applications.

In the plant protection field, quaternary ammonium compounds are useful as bactericides, fungicides, herbicides, plant growth regulators, and the like. Exemplary of commercial such products, the following are representative: 1,1'-dimethyl-4,4'-bipyridinium dichloride or paraquat; 1,1'-dimethyl-4,4'-bipyridinium dimethylsulfate; 1,1'-ethylene-2,2'-bipyridinium dibromide or diquat; 1,2-dimethyl-3,5-diphenyl pyrazolium methylsulfate or difenzoquat; 2-chloroethyltrimethylammonium chloride or chlormequat; 1-allyl-1-(3,7-dimethyloctyl) piperidinium bromide or piproctanyl.

The xanthan gum and the cationic compound are present in the compositions of the invention in amounts that are customary to this art.

No particular amounts are required according to the invention, as its principal objective is the stabilization of the xanthan gum, which is a minor component of the subject compositions.

The xanthan gum is typically present in amounts of from 0.005 to 2% by weight. Advantageously, the dilute compositions contain xanthan gum in amounts of less than 0.1%. The amount of the cationic compound may vary over very wide limits, for example, from 0.01 to 2.5% in the dilute solutions, and from 2.5 to 70% in the concentrates.

The pesticidal compositions according to the invention may also contain a finely divided active agent that is insoluble in water, together with the usual additives, such as surface active agents, antifoaming agents, freezing point depressants, etc., depending upon the particular use envisaged.

The compositions of the invention may be formulated by simple mixing of the ingredients under agitation. They may be in the form of a solution, or a concentrated or dilute suspension, containing at least the cationic organic compound and the xanthan gum in solution, in water. It is preferable to first dissolve the xanthan gum in water, then add the water soluble cationic compound, followed by the addition of the finely divided insoluble compound, and optionally, the conventional ingredients. It is possible to prepare a concentrate containing the various ingredients and then dilute it, as required, at the site of application.

In the dilute form, useful for spray applications, the plant protection compositions according to the invention may also be prepared by dilution of an aqueous concentrate containing an insoluble active agent having pesticidal activity, in suspension in the liquid thickened by the xanthan gum and the solubilization of required amount of the water soluble pesticidally active cationic compound.

In order to further illustrate the present invention and the advantages thereof, notably the compatibility of dilute aqueous solutions of a xanthan gum having a pyruvic acid content of less than 2% with a cationic quaternary ammonium compound, the following specific examples are given, it being understood that same are intended only as illustrative and in nowise limitative.

EXAMPLE 1

Samples (lots) having varying amounts of pyruvic acid moieties were prepared from a xanthan gum having a content in pyruvic acid of 3.3%, by acid hydrolysis.

The amount of pyruvic acid (g of acid per 100 g xanthan) was determined by colorimetric analysis using 2,4-dinitrophenylhydrazine as the reagent with hydrolyzed xanthan gum.

From each lot, aqueous solutions were prepared having concentrations of 0.1%, 0.05% and 0.005%. To each of these solutions, under agitation, an aqueous solution of 10% 1,1'-dimethyl-4,4'-bipyridinium dichloride (Paraquat) was added, such as to provide an active agent concentration of 0.01 to 0.2%. The precipitation of the complex of xanthan gum and the quaternary ammonium compound, if it indeed occurred, was immediate and in the form of long insoluble fibers.

The different experiments and visual observations are reported in the following Table I. It will be seen that:

(i) With xanthan concentrations of 0.1%, the gum was compatible with Paraquat in the proportions used, regardless of the amount of pyruvic acid;

(ii) With a constant amount of pyruvic acid, the compatibility decreased as an inverse function of the gum concentration;

(iii) The formation of the complex declined with decreasing pyruvic acid concentrations. With an amount of pyruvic acid equal to or less than 1.7%, the xanthan gum was considered to be compatible with the Paraquat, regardless of concentration. The presence of a few short, thin fibers in certain of the experiments did not interfere with the application of the solutions by spraying.

TABLE I

| Xanthan gum % | Amount of pyruvic acid | Paraquat % | | | | |
|---|---|---|---|---|---|---|
| | | 0.01 | 0.02 | 0.05 | 0.1 | 0.2 |
| 0.005 | 0.4 | 0 | 0 | 0 | 0 | 0 |
| | 1 | 0 | 0 | 0 | 0+ | 0+ |
| | 1.7 | 0 | 0 | 0+ | 0++ | 0++ |
| | 2.4 | 0 | 0+ | + | + | + |
| | 3.3 | + | + | + | + | + |
| 0.05 | 0.4 | 0 | 0 | 0 | 0 | 0 |
| | 1.0 | 0 | 0 | 0 | 0 | 0 |
| | 1.7 | 0 | 0 | 0 | 0 | 0 |
| | 2.4 | 0 | 0 | 0 | 0+ | 0+ |
| | 3.3 | 0+ | + | + | + | + |
| 0.1 | 1.7 | 0 | 0 | 0 | 0 | 0 |
| | 3.3 | 0 | 0 | 0 | 0 | 0 |

0: Absence of fibers
0+: Thin fibers of 1 to 2 mm - fine texture } COMPATIBLE
0++: Fibers 1 to 2 mm - fine texture
+: Long fibers >2 mm coarse texture -INCOMPATIBLE

EXAMPLE 2

Using the lots of xanthan gum prepared as in Example 1, 0.01% by weight aqueous solutions were prepared. In each of these solutions, an amount of lauryl dimethylbenzylammonium bromide (CEQUARTYL 50®) was dissolved, such as to provide an active agent concentration of 0.01 to 1%. The results relative to precipitation of any complex are reported in the Table II which follows:

TABLE II

| Xanthan gum % | Amount of pyruvic acid | Cequartyl, 50% | | | | |
|---|---|---|---|---|---|---|
| | | 0.01 | 0.02 | 0.05 | 0.1 | 1 |
| | 0.4 | 0 | 0 | 0 | 0 | 0 |
| | 1.0 | 0 | 0 | 0 | 0 | 0 |
| | 1.7 | 0 | 0 | 0 | 0 | 0 |
| | 2.4 | 0+ | + | + | + | + |
| | 3.3 | + | + | + | + | + |

0: Absence of fibers
0+: Thin fibers of 1 to 2 mm - fine texture } COMPATIBLE
+: Long fibers, more than 2 mm - coarse texture - INCOMPATIBLE

EXAMPLE 3

A fluid, concentrated suspension of atrazine (2-chloro-4-ethylamino-6-isopropylamino-1,3,5triazine) was prepared:

| | |
|---|---|
| (i) Atrazine | 400 g/l |
| (ii) Anionic surfactant | 30 g/l |

-continued

|  |  |  |
|---|---|---|
| (iii) | Xanthan gum (Pyruvic acid 1.7%) | 1.6 g/l |
| (iv) | Water q.s.p. | 1 liter |

40 ml of the concentrated fluid suspension were diluted in 940 ml distilled water. 20 ml Paraquat in a 2% aqueous solution were added. No formation of insoluble fibers was observed.

By way of comparison, an identical formulation, but prepared from a xanthan gum containing 3.4% pyruvic acid, formed dense fibers immediately following the addition of the Paraquat, under the same conditions of dilution.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A pseudoplastic aqueous concentrate, comprising formulation, in water, of a thickening amount of a xanthan gum having a content in pyruvic acid moieties of less than 2%, and at least one pesticidally active, water soluble quaternary ammonium organic cationic compound.

2. The aqueous concentrate as defined by claim 1, comprising from 0.005 to 2% by weight of said xanthan gum, and from 0.01 to 70% by weight of said at least one water soluble organic cationic compound.

3. A sprayable, water-diluted and precipitate-free formulation of the aqueous concentrate as defined by claim 1.

4. The aqueous concentrate as defined in claim 1 comprising from 0.005 to 2% by weight of xanthan gum, and from 2.5 to 70% by weight of at least one water soluble, pesticidally active organic cationic compound.

* * * * *